United States Patent [19]

Potesta

[11] Patent Number: 4,932,291
[45] Date of Patent: Jun. 12, 1990

[54] THERMAL WIRE STRIPPER

[75] Inventor: Richard E. Potesta, Chesterland, Ohio

[73] Assignee: Bares Group, Chagrin Falls, Ohio

[21] Appl. No.: 404,860

[22] Filed: Sep. 8, 1989

[51] Int. Cl.$^5$ .............................................. H02G 1/12
[52] U.S. Cl. ...................................... 81/9.44; 219/233
[58] Field of Search ................ 81/9.4, 9.44; 219/221, 219/227, 229, 233, 236, 237, 238; 30/140

[56] References Cited

U.S. PATENT DOCUMENTS 3,752,017  8/1973  Lloyd et al. .......................... 81/9.44

FOREIGN PATENT DOCUMENTS 2644935   4/1978   Fed. Rep. of Germany ......... 81/9.4
3331979   4/1985   Fed. Rep. of Germany ....... 30/90.1
0936138   6/1982   U.S.S.R. ................................. 81/9.4
 945402  12/1963   United Kingdom ................... 81/9.4
1258937  12/1971   United Kingdom ................... 81/9.4

Primary Examiner—Roscoe V. Parker

[57] ABSTRACT

A tool for removing insulation from electrical wire is provided. The tool includes a set of intersecting arms from which extend blade support members. A pair of replaceable ceramic blades having imbedded resistance heater elements are mounted on the blade support members. The blades are movable toward and away from each other upon application of pressure on the set of intersecting arms to effectuate contact between the blades and the insulation.

15 Claims, 2 Drawing Sheets

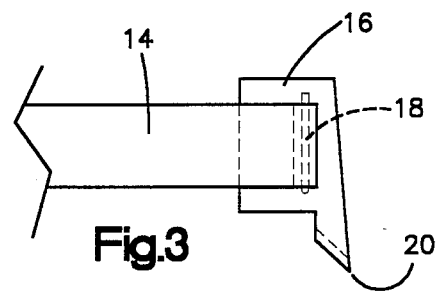
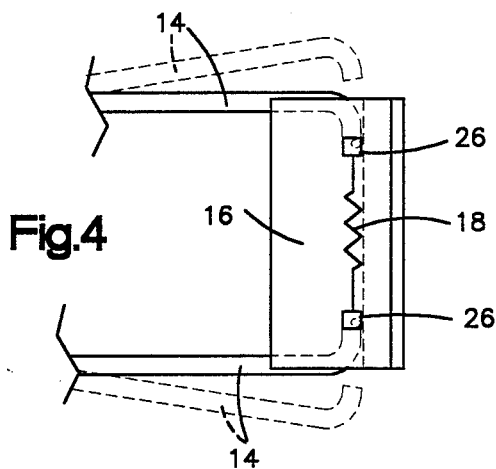
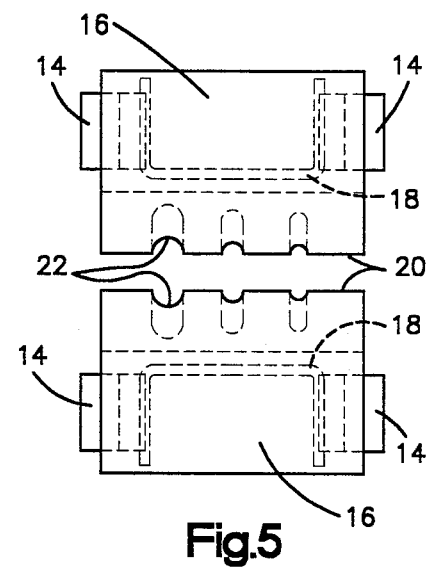
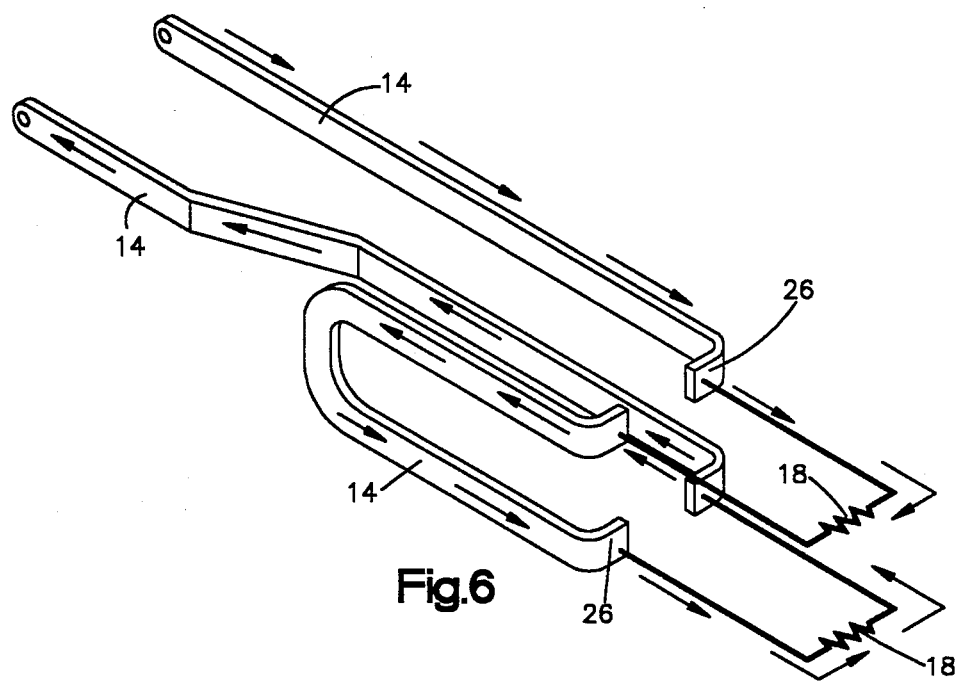

THERMAL WIRE STRIPPER

BACKGROUND OF THE INVENTION

This device relates to hand tools for stripping insulation from sections of insulated electrical wire and more particularly to a hand operated electrically heated thermal wire stripper.

In the field it is often necessary to remove insulation from electrical wire without nicking, scratching, or cutting the wire itself. Electrical failures can result from wire which has been weakened or damaged during the insulation stripping process.

In a device such as that shown in U.S. Pat. No. 4,059,892 to Siden, deformable blades of sufficient hardness to cut through the insulation, but not the wire, are employed. Significant manual pressure, however, is required to cut through the insulation, especially in the case of wires covered by Teflon insulation. This pressure, in combination with blades of sufficient hardness to cut through the Teflon insulation, can result in indentations in the wire during the stripping process.

Other devices employ thermal means to sever the insulation from the wire. Such devices, however, employ metallic blades which are electrically heated. The metal-to-metal contact between the blade and the wire which occur during the stripping process often results in a slight nicking or scratching of the wire. Also, certain military specifications specifically require that, during the stripping process, no current carrying element shall contact the wire being stripped.

It is an object of this invention to provide a thermal wire stripper using heater elements imbedded within a set of ceramic blades. The blades have semicircular mating recesses in the clamping edges thereof. These semicircular mating recesses permit the surface of the ceramic blades to contact the insulation but not the wire within.

It is another object of this invention to provide ceramic blades which can be easily replaced when they become dull, when the heater elements within them burn out, or when it becomes necessary to accommodate another size of wire.

SUMMARY OF THE INVENTION

According to the present invention, a thermal wire stripper is provided which use electrically heated ceramic blades to remove insulation from electrical wire. Means are provided to grip the hand tool and apply pressure to effectuate contact between the ceramic blades and the insulation on the wire. Means are also provided to adjust the length of insulation to be removed.

DESCRIPTION OF THE DRAWINGS

FIG. 3 is a side view of a ceramic blade of the thermal wire stripper of FIG. 1.

FIG. 4 is a top view of a ceramic blade of the thermal wire stripper of FIG. 1, illustrating the resistance heater element imbedded within, and further illustrating the blade mounts which provide connecting means for removably attaching the ceramic blade.

FIG. 5 is an end view of the ceramic blades of the device in an open position, illustrating a particular shape of the blade edges for use in a thermal wire stripper, and further illustrating the resistance heater elements imbedded within the respective ceramic blades.

FIG. 6 shows the electrical circuit of the preferred embodiment of the present invention, illustrating the resistance heater elements and the electrical conductor which provides means for carrying electrical current to the resistance heater elements.

DESCRIPTION OF THE PREFERRED EMBODIMENT

Figure 1:
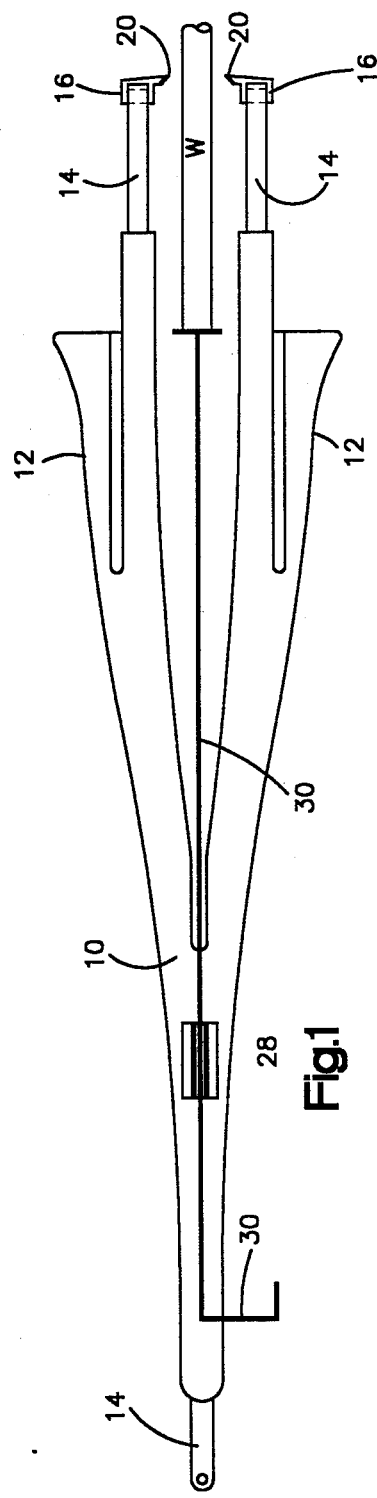
FIG. 1 is a side view of a thermal wire stripper according to the present invention.
Figure 2:
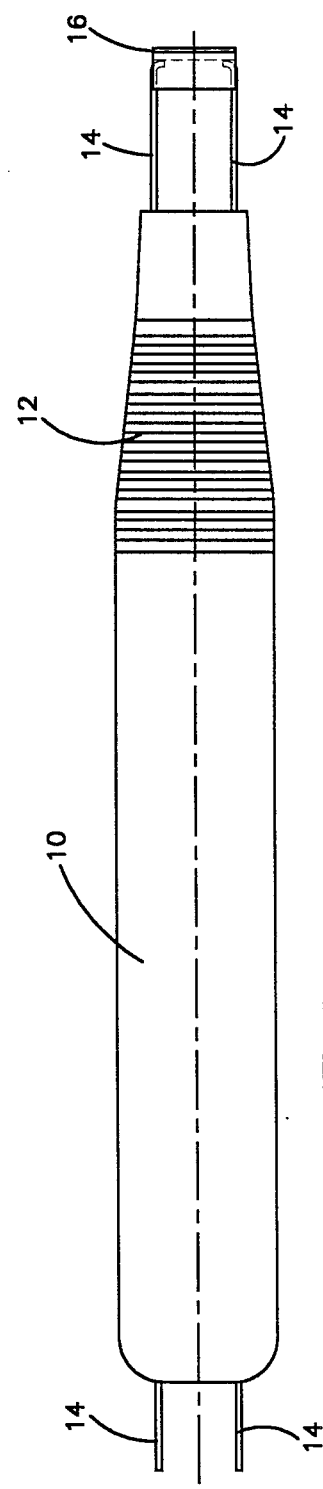
FIG. 2 is a top view of the thermal wire stripper of FIG. 1.

Referring now to the drawings, a thermal wire stripper according to this invention is shown.

FIG. 1 shows a side view of the thermal wire stripper according to the preferred embodiment of the present invention. The preferred embodiment has a one-piece pressure responsive set of insulative arms 10 which are laterally opposed and movable toward and away from each other upon application of manual pressure. Gripping portions 12 are located near the front of each arm, and a stop member 30 and stop member mount 28 are located on the pressure responsive set of insulative arms 10. Disposed within and extending laterally from each of the arms is a conductor 14 which carries electrical current to the heater elements imbedded within the ceramic blades 16. FIG. 4 more Clearly shows blade mounts 26, located near the front ends of the conductor 14. The blade mounts 26 provide means for removably attaching the ceramic blades 16, and complete the electrical circuit between the conductor 14 and the heater elements imbedded within the ceramic blades 16.

FIG. 3 shows a side view of one of the ceramic blades 16, illustrating the tapered clamping edge 20 of the blade.

FIG. 4 shows the top view of one of the ceramic blades 16. A resistance heater element 18 is imbedded within. In the preferred embodiment of the invention, the conductor 14 provides support for the ceramic blades 16 and can be spread apart, providing mechanical means for releasably attaching ceramic blades 16 to the blade mounts 26, as well as electrical means for carrying current to the resistance heater element 18.

FIG. 5 shows an end view of the ceramic blades 16 of the preferred embodiment of the present invention in an open position. Each resistance heater element 18 is imbedded within the respective ceramic blade 16. In the preferred embodiment, the resistance heater element 18 is positioned parallel to the clamping edges 20 of the ceramic blades 16. FIG. 5 also shows, located on the clamping edges 20 of the ceramic blades 16, three semicircular mating recesses 22 having a diameter less than the diameter of the insulation and approximately equal to the diameter of the wire to be stripped. In the preferred embodiment, the ceramic blades 16 consist essentially of aluminum oxide.

FIG. 6 shows the electrical circuit means of the preferred embodiment comprising resistance heater elements 18 connected electrically in series by the conductor 14 disposed within and extending the entire length of the set of insulative arms 10. Each of the resistance heater elements 18 contacts the electrical conductor 14 at the blade mounts 26 located at the ends of the conductor 14. The electrical circuit means is connectable to an outside current source (not shown). The electrical circuit means, when energized by the outside current source, permits electrical current to flow through the imbedded resistance heater elements 18, thereby heating the ceramic blades 16. Connecting the resistance heater elements 18 in series eliminates the possibility of operating the device while only one of the elements is functioning. In addition, each element will generate the same amount of heat during operation.

Operation

In operation, the electrical circuit means is energized by an alternating or direct current source causing electrical current to flow through the imbedded resistance heater elements 18. The imbedded resistance heater elements 18 heat the respective ceramic blades 16 to a temperature sufficient to melt electrical wire insulation. The stop member 30 of FIG. 1 is adjusted to correspond to the desired length of insulation that is to be removed from an electrical wire W. The electrical wire W is then inserted axially along the path of the adjustable stop member 30 and between a pair of semi-circular mating recesses 22 until the wire abuts the stop member 30. The device is then grasped in one hand by the gripping portions 12 located on the set of electrically insulative arms 10. Pressure is exerted to move the ceramic blades 16 toward each other and accomplish mating of the semi-circular mating recesses 22. The clamping edges 20 of the ceramic blades 16 are then brought into contact with and immediately begin to melt through the insulation on the wire W.

The wire W can then be removed while the arms 10 of the thermal wire stripper are in a closed position. The portion of insulation just removed remains held in place by the clamping edges 20 of the ceramic blades 16. Upon release of pressure to the arms 10, the ceramic blades 16 move away from each other and the portion of insulation just removed can be discarded.

The ceramic blades 16 act as an electrical insulator, thereby preventing the wire being stripped from causing an electrical short between each of the resistance heater elements 18. Although ceramic materials in general have a slightly higher specific heat than steel, the lower specific gravity (or density) of ceramics reduces the amount of heat required to bring the curring edges to operating temperature.

Experience has shown that the melted insulation material does not have the tendency to adhere to ceramic as it does to steel. Thus the blades remain free of any debris and the resulting portion of bare electrical wire is cleaner and better suited for its ultimate electrical connection.

Other Embodiments

Other embodiments of the present invention may use, in place of the one-piece pressure responsive set of electrically insulative arms 10, two separate arms hinged together at the rear ends thereof and a spring disposed adjacent to and between the rear ends of the arms. Still other embodiments may use nonelectrically insulative arms, or provide means for a non-manual application of pressure to accomplish the movement of the arms toward and away from each other.

In the preferred embodiment, the conductor 14 is imbedded within the set of insulative arms 10 and the stop number mount 28 is located external to the arms 10. Other embodiments may locate the conductor 14 external to the set of arms 10 and may not use a stop member 30 or a stop member mount 28.

The ceramic blades 16 of the preferred embodiment consist essentially of aluminum oxide and have tapered clamping edges 20 with semi-circular mating recesses 22. The blades 16 are removably attachable to the conductor 14 at the blade mounts 26, and have resistance heater elements 18 imbedded within and positioned parallel to the clamping edges 20. Other embodiments of the present invention may use blades 16 consisting of a similar ceramic material of lower density and mass than typical metallic blades. Still other embodiments may use rounded or otherwise shaped ceramic blades 16 which may not have semicircular mating recesses 22 associated therewith. Still other embodiments may position the resistance heater elements 18 at any location within the ceramic blades 16, or may permanently attach the blades to the conductor 14.

What is claimed is:

1. A thermal wire stripping device, comprising:
   a pressure responsive set of arms laterally opposed and moveable toward and away from each other upon application of pressure, said arms having front and rear ends, said arms functionally interconnected at some point between said front and rear ends;
   an electrical conductor for carrying electrical current to blades;
   blade mounts disposed at the ends of said conductor, said blade mounts providing connecting means for removably connecting blades to said arms;
   a pair of laterally opposed blades comprised of ceramic material removably connected to said connecting means of said blade mounts, each laterally opposed blade having a clamping edges;
   resistance heater elements associated with the respective blades and spaced from the clamping edges; and
   electrical circuit means comprising said resistance heater elements, said blade mounts and said electrical conductor, said electrical circuit means constituting a closed circuit when and only when each of said blades is mounted in said blade mounts, said electrical circuit means connectable to a current source and capable of carrying electrical current; whereby
   the resistance heater elements heat the ceramic blades independent of contact with a wire when the blades are mounted in closed circuit relationship, allowing the blades to melt through the insulation on a wire to be stripped while preventing metal-to-metal contact with the wire itself during the stripping process.

2. The invention of claim 1 in which said laterally opposed blades consist essentially of aluminum oxide or similar ceramic material.

3. The invention of claim 1 in which said set of arms comprises two separate arms hinged together at the rear ends thereof and a spring disposed adjacent to and between said rear ends of arms.

4. The invention of claim 1 in which said set of arms comprises a one-piece unit, the arms of said one-piece unit laterally opposed and moveable toward and away from each other upon application of manual pressure.

5. The invention of claim 1 in which said clamping edges have a plurality of semi-circular mating recesses having a diameter less than the diameter of the insulation an approximately equal to the diameter of the wire to be stripped.

6. The invention of claim 1 in which said electrical conductor is disposed within and extending laterally through the entire length of said pressure responsive set of arms.

7. The invention of claim 1 in which said set of arms consists of an electrically insulative material.

8. The invention of claim 1 in which said electrical circuit means is connectable to an outside alternating or direct current source.

9. The invention of claim 1 in which said set of arms includes gripping portions which are serrated and located near said front ends of said arms.

10. The invention of claim 1 in which said clamping edges of aid blades are tapered.

11. The invention of claim 1 in which said resistance heater elements are disposed parallel to said clamping edges.

12. The invention of claim 1 in which said connecting means for removably attaching said laterally opposed blades comprises an electrically conductive metallic clip connected to said electrical circuit means and connectable to s aid resistance heater elements.

13. The invention of claim 1 in which said resistance heater elements are imbedded within the respective blades.

14. The invention of claim 1 further comprising a stop member slidably mounted on one of said arms by means of a stop member mount, said stop member positioned to act as a spacer element to adjustably limit within a given range the amount of insulation to be removed, said stop member positioned to permit longitudinal sliding movement of the stop member relative to a wire to be stripped.

15. The invention of claim 1 in which said electrical circuit means comprises an electrically conductive material and said resistance heater elements connected electrically in series.

* * * * *

UNITED STATES PATENT AND TRADEMARK OFFICE
CERTIFICATE OF CORRECTION

PATENT NO. : 4,932,291
DATED : June 12, 1990
INVENTOR(S) : Richard E. Potesta

It is certified that error appears in the above-identified patent and that said Letters Patent is hereby corrected as shown below:

ON TITLE PAGE:

Please add as co-inventor --J. Edward C. Anderson, Moreland Hills, Ohio.--

Column 5, line 11 after "of" delete [aid], insert --said--

Column 6, line 2 after "to" delete [s aid], insert --said--

Signed and Sealed this

Tenth Day of September, 1991

*Attest:*

HARRY F. MANBECK, JR.

*Attesting Officer*     *Commissioner of Patents and Trademarks*